(12) United States Patent
Nerone

(10) Patent No.: US 6,636,027 B1
(45) Date of Patent: Oct. 21, 2003

(54) LED POWER SOURCE

(75) Inventor: Louis R. Nerone, Brecksville, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/695,129

(22) Filed: Oct. 24, 2000

(51) Int. Cl.$^7$ .............................................. H03H 1/00
(52) U.S. Cl. .................................... 323/364; 323/908
(58) Field of Search ................................ 323/364, 908, 323/901; 363/49; 361/58, 93.1

(56) References Cited

U.S. PATENT DOCUMENTS

| | | | |
|---|---|---|---|
| 4,271,408 A | 6/1981 | Teshima et al. | |
| 4,839,564 A | * 6/1989 | Ide et al. | 315/169.4 |
| 5,463,280 A | 10/1995 | Johnson | 315/187 |
| 5,936,599 A | 8/1999 | Reymond | 345/82 |
| 6,060,793 A | * 5/2000 | Cousy | 307/125 |

FOREIGN PATENT DOCUMENTS

| | | |
|---|---|---|
| DE | 2 304 620 | 1/1973 |
| JP | 07273371 | 10/1995 |
| JP | 08137429 | 5/1996 |

OTHER PUBLICATIONS

"1998 IESNA Software Survey", LD+A, Oct. 1998, pp. 53–62.

* cited by examiner

*Primary Examiner*—Jessica Han
(74) *Attorney, Agent, or Firm*—Fay, Sharpe, Fagan, Minnich & McKee, LLP

(57) ABSTRACT

A cost and space efficient diode circuit arrangement for limiting current from an AC source using only a few components, the circuit includes a capacitor coupled to an AC source and at least two oppositely polarized diodes connected in parallel. This circuit may be used in a variety of applications. For example, the circuit finds particular use in household appliances and electronics, such as vacuum cleaners, where electrical compartment space for light emitting diodes (LEDs) is constrained.

16 Claims, 3 Drawing Sheets

LED POWER SOURCE

BACKGROUND OF THE INVENTION

This invention relates to an electrical circuit, and in particular, to an electrical circuit that limits the current through a light emitting diode.

Incandescent lamps are used in a wide array of environments and have generally found substantial commercial success in meeting various demands. More recently, industry is seeking an alternative light source that has an extended life and can endure the rigors of applications that experience mechanical vibration or shock, a problem area for relatively fragile filaments or coils of an incandescent lamp. An exemplary use of an incandescent lamp in this type of environment is in household appliances such as vacuum cleaners. Incandescent lamps have been widely used in vacuum cleaners in the past. However, the incandescent lamp encounters a great deal of mechanical shock when the vacuum cleaner is in use and is thus subject to mechanical failure. As a result, incandescent lamps have a shorter life and require frequent replacement.

Light emitting diodes (LEDs) have been suggested as alternative light sources for incandescent lamps due to their robust structure that is able to withstand mechanical vibrations and the long life associated with their efficient operation. In this environment, a source current is much greater than the maximum current allowed for LEDs. To limit the current through the LEDs, it is known in the art to use resistors once alternating current (AC) has been converted to direct current (DC) such as by bridge rectifiers. One problem associated with this approach is the thermal issue associated with such circuits because resistors heat as they dissipate electrical energy. Further, proper heat dissipation is necessary because improper heat dissipation is a leading cause of resistor failure. Thus, many of the energy benefits offered by the alternative use of LEDs as the light source are eliminated.

Another problem with this approach is that there is only a very limited electrical area or compartment typically associated with household appliances. Thus, the diodes and the current limiting components must be configured to fit within this compact area without overheating the area and causing component failure.

Another suggested approach to limiting the current supplied to LEDs is eliminating the rectifier and connecting the resistor in series with a pair of oppositely polarized LEDs. The inefficiencies of the rectifier circuit, however, are not solved since a resistor is still employed as the current limiting device.

Yet another approach to limiting current is employing an inductor connected with a pair of oppositely polarized LEDs. Due to the size of inductor required, this method is not desirable for use where space is constrained. Additionally, ideal inductors cannot support a DC voltage and thus, cannot correct for imbalances in the diodes.

Accordingly, a need exists for an alternative manner of limiting current.

BRIEF SUMMARY OF THE INVENTION

The present invention provides a more cost efficient electrical circuit for limiting current.

The present invention uses only a few components and takes up less space in an electrical compartment.

Current is limited by the reactance of a capacitor rather than by resistance or inductive reactance. A current limiting circuit for a diode comprises a capacitor coupled to a load and at least two diodes, the diodes being oppositely polarized and connected in parallel.

In another embodiment, the capacitor is coupled to at least one pair of oppositely polarized diodes connected in parallel.

In yet another embodiment, the capacitor is coupled to two oppositely polarized parallel branches of diodes.

This circuit has a number of advantages over the prior art. The current limiting circuit only requires three components, namely one capacitor and two LEDs connected to a load, namely an AC source. This circuit occupies less space in an electrical compartment than any of the prior art circuits.

Another advantage resides in the use of a capacitor which is more cost effective and compensates for any DC voltage imbalance.

Still another advantage is realized since capacitors are more efficient than resistors and inductors.

DETAILED DESCRIPTION OF THE INVENTION

Figure 1:
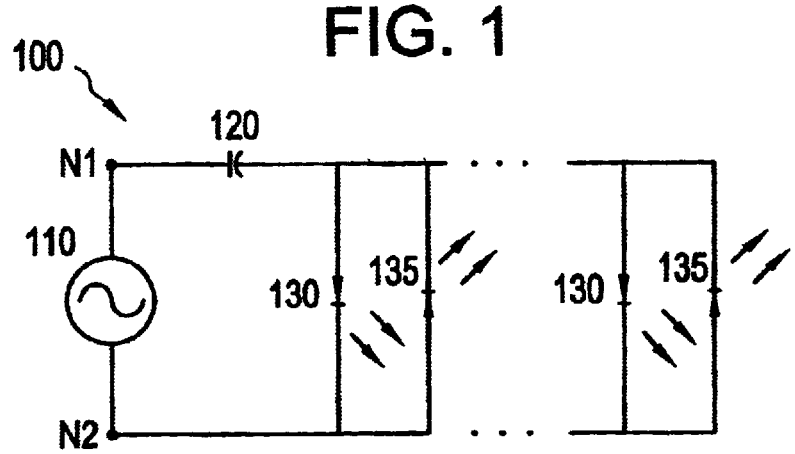
FIG. 1 is a schematic diagram of an exemplary embodiment of a current limiting circuit according to the present invention.

With reference to the Figures, several embodiments of the present invention will now be shown and described. Like reference numerals are used to indicate the same element throughout the specification. FIG. 1 is a schematic diagram of an exemplary embodiment of a current limiting circuit according to the present invention.

Referring to FIG. 1, the exemplary current limiting circuit 100 includes a load or AC power source 110 connected in series to a reactive current limiting device or capacitor 120. The capacitor 120 is connected in series to first and second oppositely polarized LEDs 130, 135. The LEDs 130, 135 are disposed in parallel so that the LEDs 130, 135 encounter the same electrical potential, and each diode 130 or 135 is illuminated during each half cycle. The LEDs 130, 135 are preferably oppositely polarized in a manner well known in the art.

AC power source 110, for example, is typically a 120 volt 60 Hz AC power supply although differently rated power sources can be used without departing from the scope and intent of the invention. The LEDs 130, 135 in the exemplary embodiment require a forward operating voltage between about 1.7 to 4.7 volts (V). The LEDs 130, 135 typically have a maximum reverse operating voltage of approximately 5 V. White LEDs have a forward voltage of about 4.7 V at about 70 milliamps (mA) and are intended to handle a maximum current of approximately 70 mA without overheating. The typical DC current through the LEDs 130, 135 is approximately 20 to 40 mA. However, the amount of DC current depends upon the brightness level desired. These component values are merely representative and should not be considered limiting in any manner.

The size of the capacitor 120 needed for the current limiting circuit depends upon the desired brightness level of the LEDs. First, the impedance necessary to limit the current to the desired brightness is calculated. This impedance may be approximated by $$Z = \frac{\sqrt{2} \cdot V}{\pi \cdot I}$$

where I is the average current flowing through the LED 130 or 135 expressed in amps and V is the rms voltage expressed in volts. This voltage is approximately equal to the source voltage if the forward voltage of the LED 130 or 135 is much lower than this source voltage.

Next, a capacitor size necessary to achieve a capacitive reactance equivalent to the impedance calculated above is selected. The capacitive reactance is calculated using, for example, the following formula:

$$C = 1/(2*pi*f*X_c)$$

where f is the frequency expressed in Hertz (Hz) and $X_c$ is the capacitive reactance expressed in ohms. In the exemplary current limiting circuit 100, where the desired current through the LEDs 130, 135 is 20 mA, the capacitive reactance is 2.7K ohms, and the capacitor 120 has a capacitance of 1 $\mu$F.

The current limiting circuit 100 operates as follows. During operation, a sinusoidal AC voltage is presented to input terminals N1 and N2. The varying applied voltage causes the capacitor 120 to charge and discharge. There is no current through a dielectric (insulative) portion of the capacitor 120, but the charging and discharging of the capacitor 120 produces current in the current limiting circuit 100 connected to the capacitor plate. The current from the capacitor 120 reaches the LEDs 130, 135 and has the same frequency as the applied voltage of the AC power source 110. Thus, the capacitor 120 provides an alternating current to energize the LEDs 130, 135, and by selecting the size of the capacitor 120, the alternating current applied to the LEDs 130, 135 is dependent on the capacitive reactance. Current flows through the capacitor 120, which has a capacitive reactance equivalent to the current limiting impedance (2.7 K ohms in this example). The average current flowing through each diode is 20 mA, causing the LED 130 to emit light while the current through the oppositely polarized LED 135 is blocked.

While capacitors do have power losses, such as leakage current and an equivalent series resistance, these losses are usually very small in comparison to the power they transfer. Thus, the current through the diode is limited more efficiently, and this circuit may be used in a variety of applications. This circuit is particularly useful in lighting applications where the electrical compartment space is limited, such as in a vacuum cleaner or nightlight.

Figure 2:
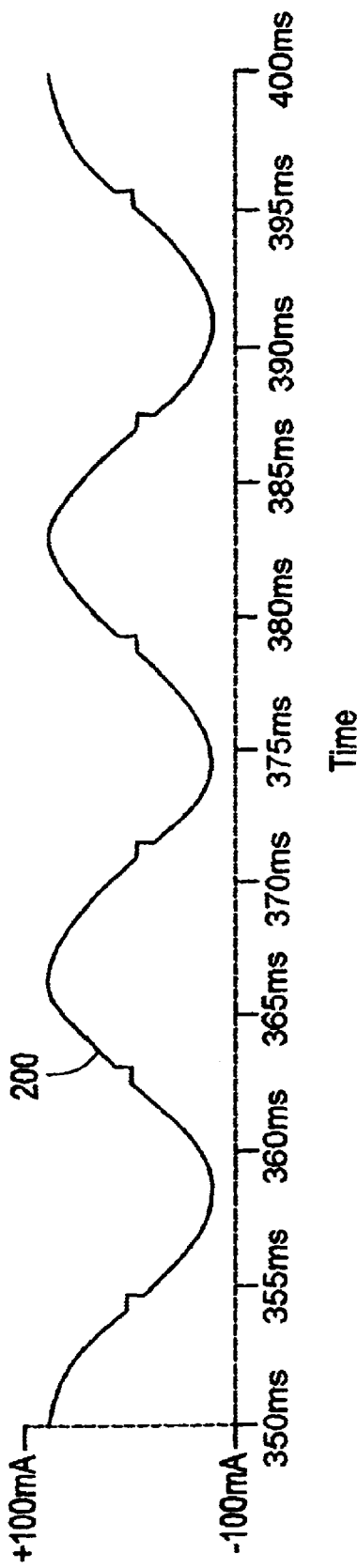
FIG. 2 shows a waveform diagram associated with the operating current limiting circuit of FIG. 1.

FIG. 2 shows a waveform diagram of the current 200 through the capacitor 120 in the operating current limiting circuit 100. The X-axis represents time expressed in milliseconds (ms), and the Y-axis represents current expressed in milliamps (mA). As can be seen, the current 200 through the capacitor 120 is substantially a sinusoid ranging from −63 mA to 63 mA.

Figure 3:
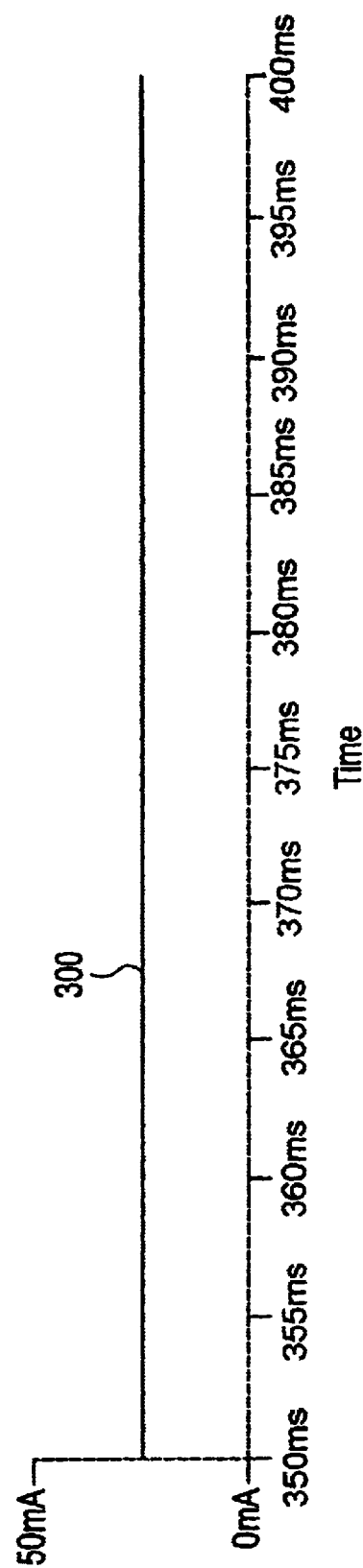
FIG. 3 shows a waveform diagram associated with the operating current limiting circuit of FIG. 1.

FIG. 3 illustrates the average current 300 through the capacitor 120. The X-axis represents time expressed in milliseconds (ms), and the Y-axis represents current expressed in mA. As can be seen, the average current 300 through the capacitor 120 is 0 mA.

Figure 4:
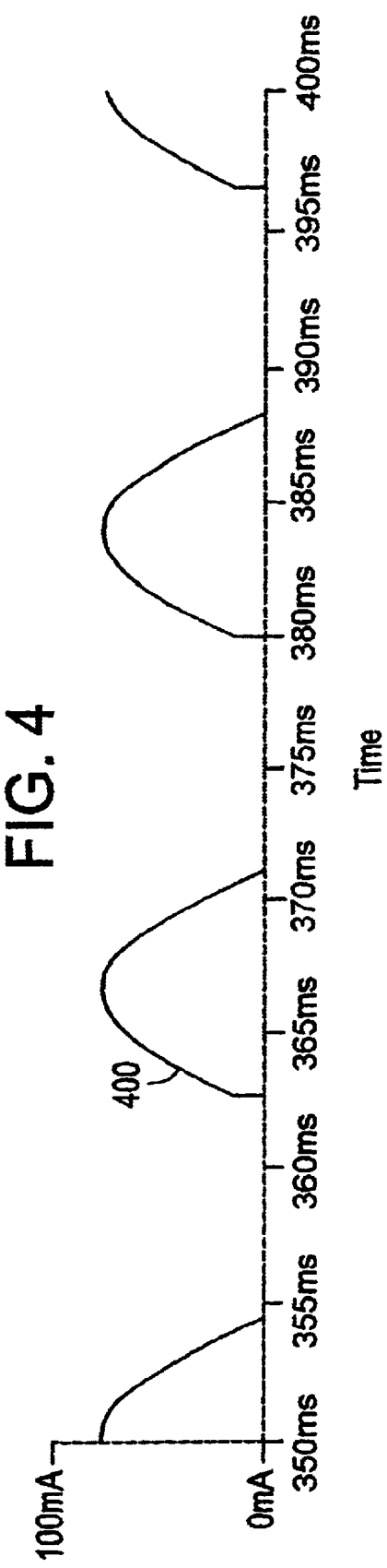
FIGS. 4 and 5 show the waveform diagrams associated with the operating current limiting circuit of FIG. 1.
Figure 5:
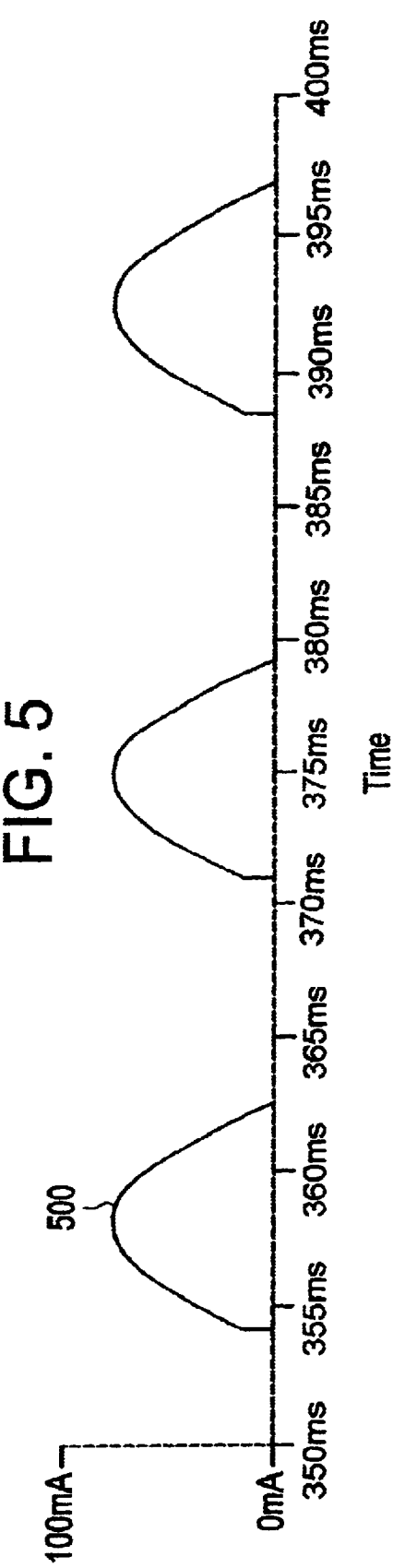

FIGS. 4 and 5 show the waveform diagrams of the current 400, 500 through the LEDs 130, 135 in the operating current limiting circuit 100. The X-axis represents time expressed in milliseconds (ms), and the Y-axis represents current expressed in milliamps (mA). The current 400 through the first LED 130 mirrors the current 200 through the capacitor 120 for one half cycle. The current 500 through the oppositely polarized LED 135 is substantially identical to the current 400 through the LED 130 with a 180 degree phase shift.

It is noted that for alternative embodiments of the present invention, such as those shown in FIGS. 6 and 7 and described in further detail below, the waveform diagrams shown in FIGS. 2–5 would be the same.

Figure 6:
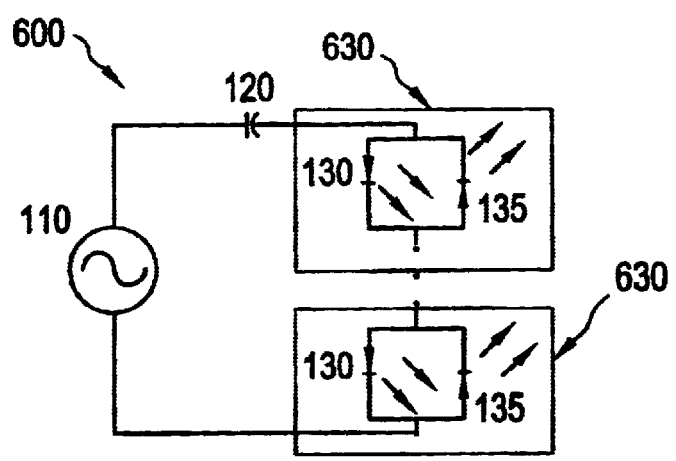
FIG. 6 is a schematic diagram of a second embodiment of a current limiting circuit according to the present invention.

FIG. 6 is a schematic diagram of a second embodiment of a current limiting circuit 600 according to the present invention. The current limiting circuit 600 includes an AC power source 110 connected in series to a capacitor 120. At least one pair 630 of oppositely polarized LEDs 130, 135 is connected in parallel. The LED pair 630 is, of course, connected in series with the capacitor 120.

Figure 7:
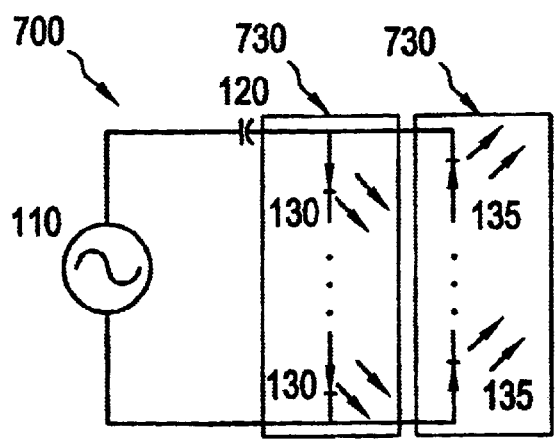
FIG. 7 is a schematic diagram of a yet another embodiment of a current limiting circuit according to the present invention.

FIG. 7 is a schematic diagram of yet another embodiment of a current limiting circuit 700 according to the present invention. The current limiting circuit 700 includes an AC power source 110 connected in series to a capacitor 120. The capacitor 120 is connected in series to two oppositely polarized parallel branches 730 of LEDs 130, 135. Each branch 730 may contain an unlimited number of LEDs 130 or 135 polarized the same way. While it is preferred that each oppositely polarized branch 730 contains an equal number of LEDs 130 or 135, having an uneven number of LEDs 130 or 135 is acceptable as long as the voltage across each oppositely polarized branch 730 of LEDs 130 or 135 is substantially the same. The capacitor 120 accounts for any imbalance in the voltage between the branches 730. However, the unevenness of the distribution of LEDs 130 or 135 between branches 730 is limited by the reverse voltage allowed by LEDs 130, 135.

In summary, the present invention provides a manner of efficiently powering LEDs from an AC source without an external rectification device/component. The invention minimizes the power loss in the current limiting element (i.e., the capacitor). It uses a reactive component to limit current as opposed to a conventional approach that uses resistors to limit the current. The application of the invention is associated with an even number of LEDs although it will be appreciated that the number of LEDs in a particular branch of the circuit may vary.

Furthermore, since numerous modifications and variations will readily occur to those skilled in the art, the present invention is not limited to the exact construction and operation illustrated and described herein. Accordingly, all suitable modifications and equivalents which may be resorted to are intended to fall within the scope of the claims.

What is claimed is:

1. A current limiting circuit to limit current to diodes having known operational characteristics, the current being limited to obtain a desired brightness output from the diodes, comprising:

(a) an AC source;

(b) a reactive capacitor coupled to said AC source for limiting a current; and (c) at least two diodes having the known operational characteristics are coupled in series to said reactive capacitor, said diodes being oppositely polarized and connected in parallel, wherein an impedance of the circuit to generate a desired brightness from the at least two diodes is given by a formula of the form:

$$Z = \frac{\sqrt{2} \cdot V}{\pi \cdot I},$$

Z being an impedance value, I being the average current flowing through one of the first and second diodes in amps, and V being an rms voltage expressed in volts, and wherein a reactive capacitor value equivalent to the obtained impedance value is calculated by an equation of the form:

$C=1/(2*\text{pi}*f*X_c)$,

C being the reactive capacitor value, f being frequency expressed in Hertz, and $X_c$ is the capacitive reactance expressed in ohms.

2. The circuit according to claim 1, wherein said reactive capacitor value is calculated by an equation of the form:

$C=1/(2*\text{pi}*f*X_c)$, wherein C is the reactive capacitor value, f is frequency expressed in Hertz, and $X_c$ is the capacitive reactance expressed in ohms.

3. The circuit according to claim 1, wherein said diodes are light emitting diodes.

4. A method of powering diodes from an associated AC source, comprising:

(a) determining a desired brightness of diodes having known operational characteristics;

(b) obtaining an impedance value to limit the current to obtain the desired brightness, derived by a formula of the form:

$$Z = \frac{\sqrt{2} \cdot V}{\pi \cdot I},$$

Z being an impedance value, I Being average current flowing through one of the first and second diodes in amps, and V being an rms voltage expressed in volts;

(c) calculating a reactive capacitor value equivalent to the obtained impedance value is obtained by an equation given by:

$C=1/(2*\text{pi}*f*X_c)$,

C being the reactive capacitor value, f being frequency expressed in Hertz, and $X_c$ the capacitive reactance expressed in ohms;

(d) providing a reactive capacitor having the value obtained in step (c) coupled to said associated AC source for limiting a current; and (e) supplying at least first and second diodes coupled in series to siad reactive capacitor, said first and second diodes being oppositely polarized and connected in parallel.

5. The circuit according to claim 1, wherein the reactive capacitor and diodes are configured to be housed within an electrically driven household appliance.

6. A circuit adapted to limit current from an associated AC source, comprising:

(a) a reactive capacitor coupled to said associated AC source for limiting a current; and (b) at least two light emitting elements coupled in series to said reactive capacitor, said light emitting being oppositely polarized and connected in parallel, wherein an impedance of the circuits to generate a desired brightness from the at least two diodes is given by a formula of the form:

$$Z = \frac{\sqrt{2} \cdot V}{\pi \cdot I},$$

Z being an impedance value, I being the average current flowing through one of the first and second diodes in amps, and V being an rms voltage expressed in volts, and wherein a reactive capaciotr value equivalent to the obtained impedance value is calculated by an equation of the form:

$C=1/(2*\text{pi}*f*X_c)$,

C being the reactive capacitor value, f being frequency expressed in Hertz, and $X_c$ being the capacitive reactance expressed in ohms.

7. A current limiting circuit, comprising:

(a) a reactive capacitor coupled to a source for limiting a current; and (b) at least one pair of light emitting elements coupled in series to said reactive capacitor, said pair of light emitting elements being oppositely polarized and connected in parallel.

8. The circuit according to claim 6, wherein the reactive capacitor and diodes are configured to be housed within an electrically driven household appliance.

9. A current limiting circuit, comprising:

(a) a reactive capacitor coupled to a source for limiting a current; and (b) two branches of light emitting elements coupled in series to said reactive capacitor, said branches of light emitting elements being oppositely polarized and connected in parallel.

10. The circuit according to claim 9, wherein said light emitting elements are light emitting diodes.

11. The circuit according to claim 9, wherein the reactive capacitor and diodes are configured to be housed within an electrically driven household appliance.

12. The method of claim 11, wherein said reactive capacitor value is calculated by an equation given by:

$C=1/(2*\text{pi}*f*X_c)$, wherein C is the reactive capacitor value, f is frequency expressed in Hertz, and $X_c$ is the capacitive reactance expressed in ohms.

13. The method according to claim 11, wherein an impedance is derived by a formula of the form:

$$Z = \frac{\sqrt{2} \cdot V}{\pi \cdot I},$$

wherein Z is an impedance value, I is average current flowing through one of the first and second diodes in amps, and V is an rms voltage expressed in volts.

14. The method according to claim 11, wherein said reactive capacitor compensates for voltage imbalances in the circuit.

15. A circuit adapted to limit current from an associated AC source, comprising:

(a) a reactive capacitor coupled to said associated AC source for limiting a current; and (b) at least two light emitting elements coupled in series to said reactive capacitor, said light emitting elements being oppositely polarized and connected in parallel.

16. The circuit according to claim 15, wherein said light emitting elements are light emitting diodes.

* * * * *